(No Model.)
W. P. PATTON.
Apparatus for Generating Hydrocarbon Illuminating and Heating Gas.
No. 235,451.     Patented Dec. 14, 1880.
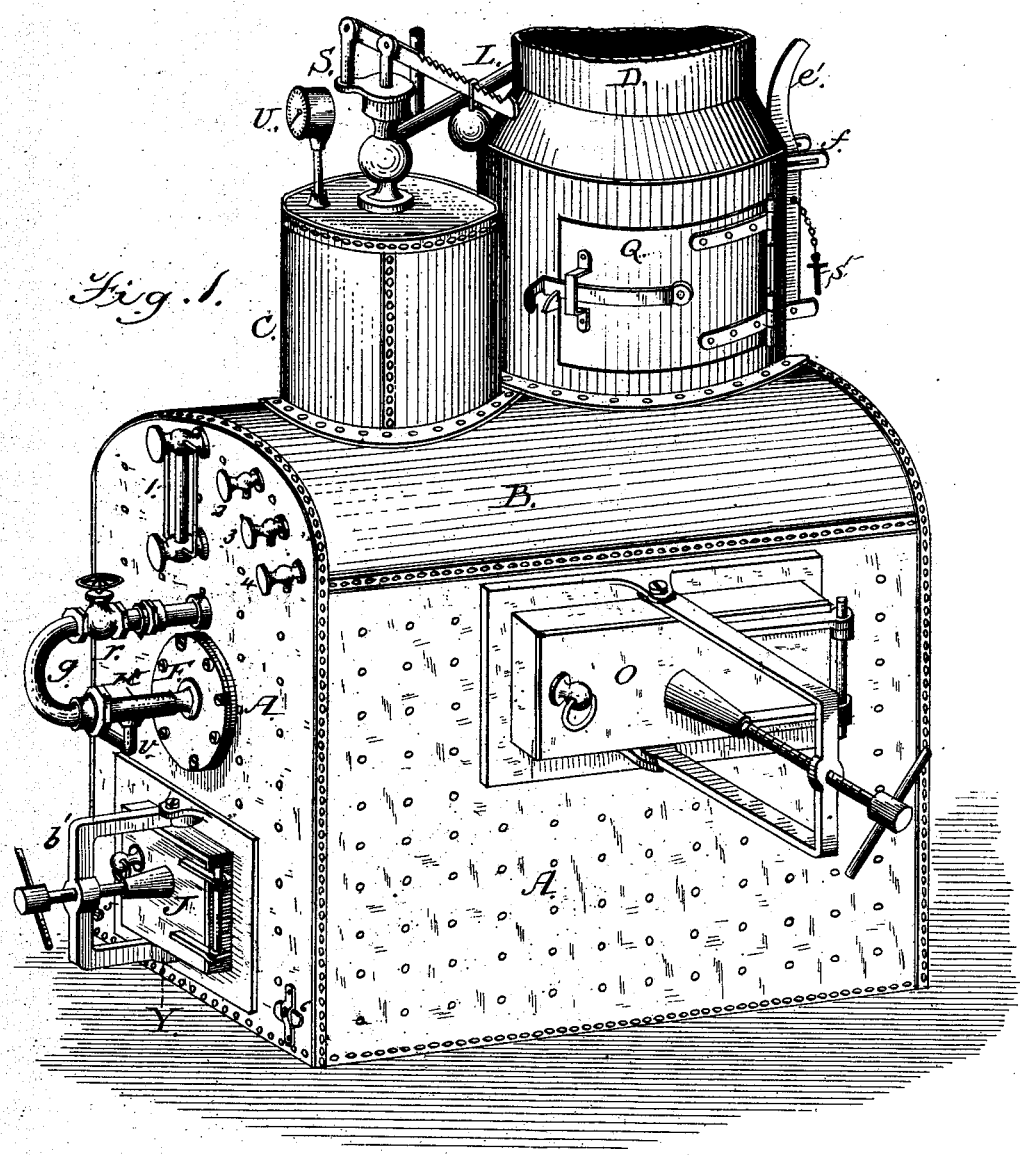

(No Model.) 3 Sheets—Sheet 2.
W. P. PATTON.
Apparatus for Generating Hydrocarbon Illuminating and Heating Gas.
No. 235,451. Patented Dec. 14, 1880.
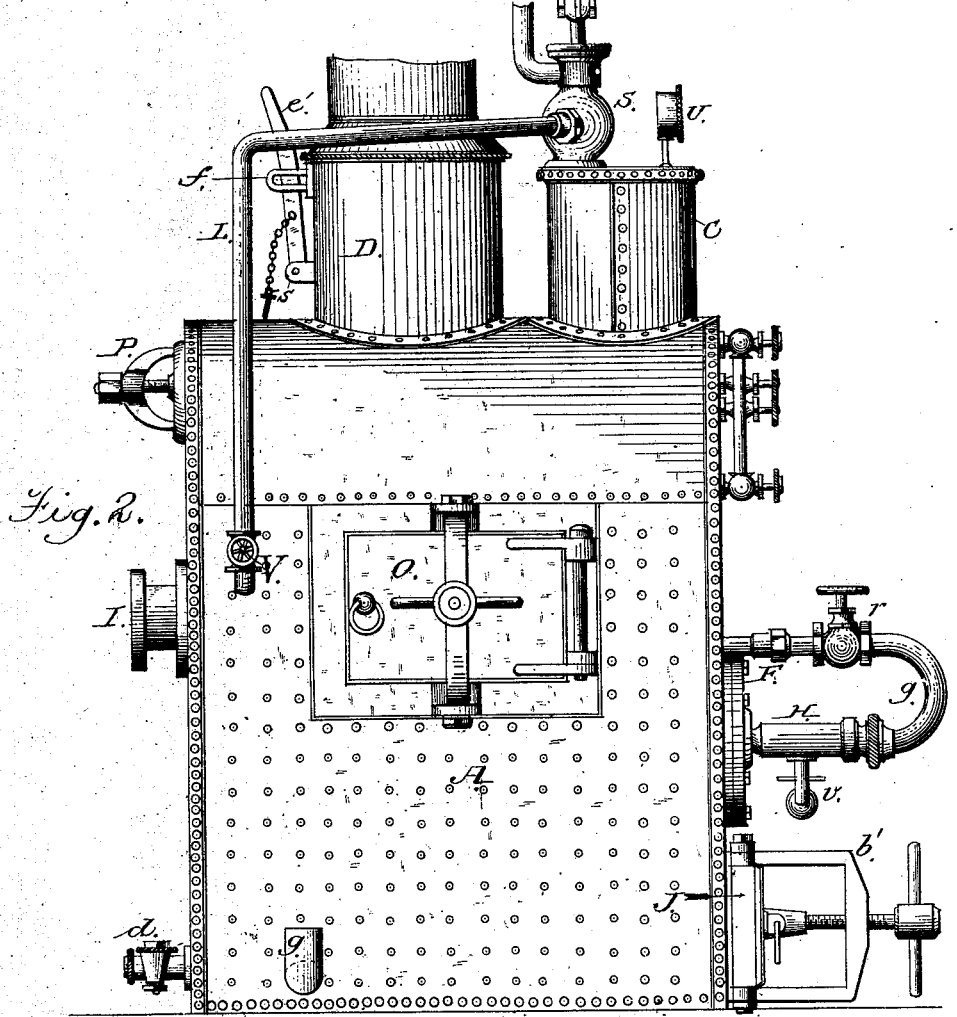
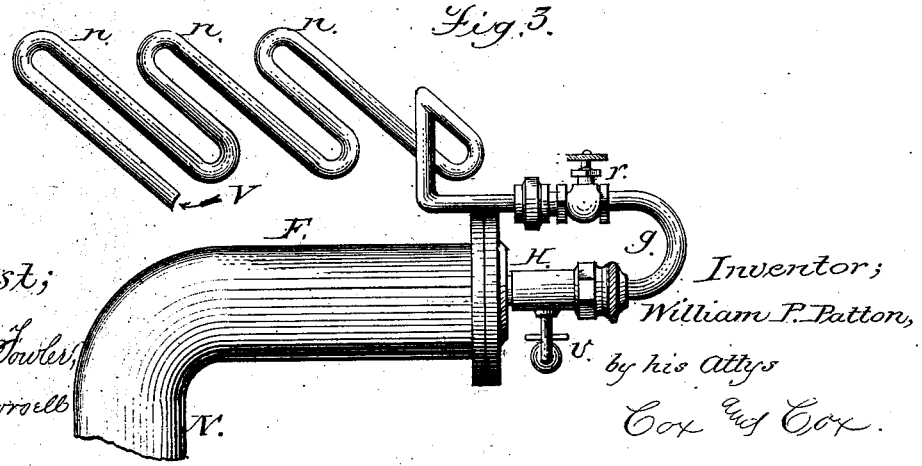
Attest:
J. Walter Fowler
W. F. Morrell
Inventor;
William P. Patton,
by his Atty's
Cox and Cox.

(No Model.)
W. P. PATTON.
Apparatus for Generating Hydrocarbon Illuminating and Heating Gas.
No. 235,451. Patented Dec. 14, 1880.
3 Sheets—Sheet 3.
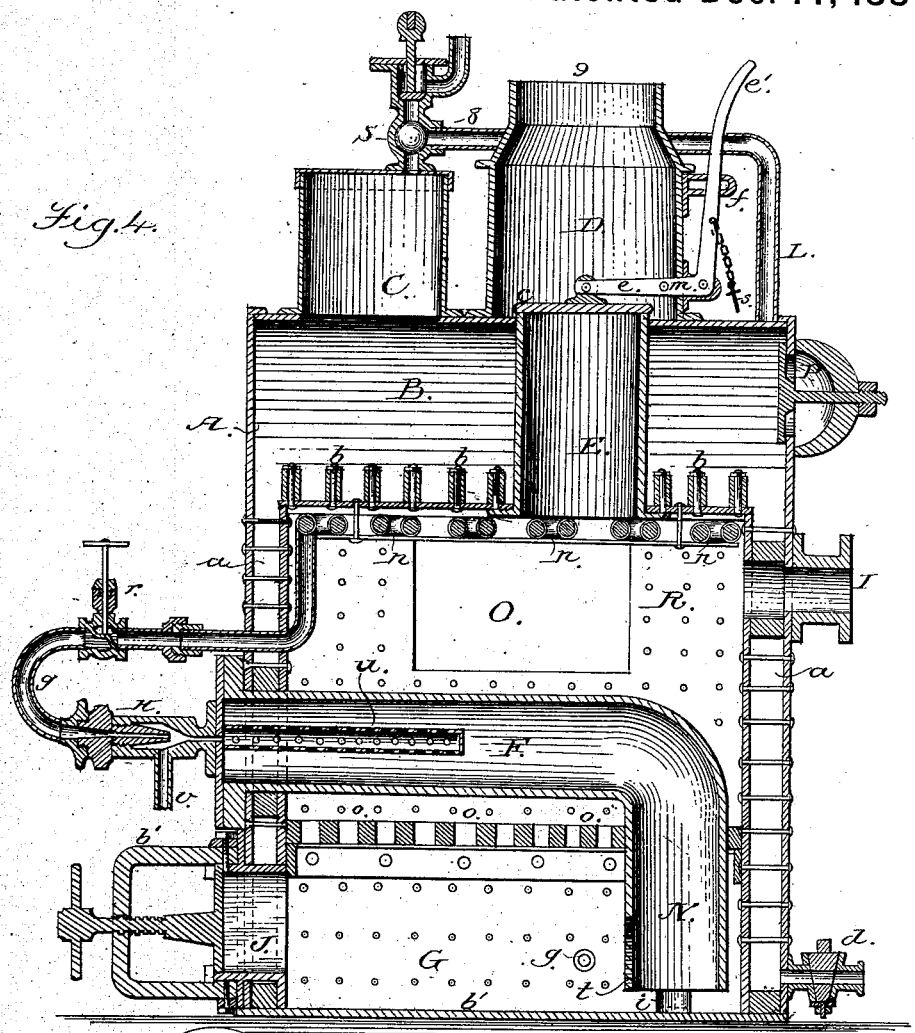
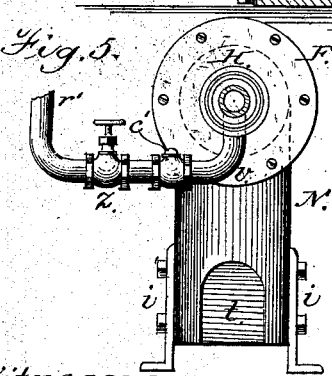
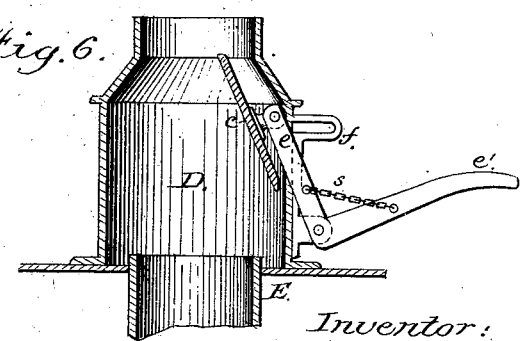
Witnesses:
J. Walter Fowler,
W. H. Morsell.
Inventor:
William P. Patton,
by his atty's
Cox & Cox

UNITED STATES PATENT OFFICE.

WILLIAM P. PATTON, OF HARRISBURG, PENNSYLVANIA, ASSIGNOR OF ONE-HALF TO JOHN HERVEY PATTON, OF SAME PLACE.

APPARATUS FOR GENERATING HYDROCARBON ILLUMINATING AND HEATING GAS.

SPECIFICATION forming part of Letters Patent No. 235,451, dated December 14, 1880.

Application filed June 26, 1880. (No model.)

*To all whom it may concern:*

Be it known that I, WILLIAM P. PATTON, of the city of Harrisburg, county of Dauphin, and State of Pennsylvania, have invented a new and Improved Apparatus for Generating Hydrocarbon Illuminating and Heating Gas, of which the following is a specification, reference being had to the accompanying drawings.

My improved generator is fully illustrated in the accompanying drawings, in which—

Figure 1, Plate 1, represents a front and right side perspective elevation. Fig. 2, Plate 2, is a left-side perspective elevation. Fig. 4, Plate 3, is a longitudinal sectional elevation, taken on the line $y$. (See Fig. 1.) The views Figs. 3, 5, and 6 are representations of parts of the device.

Like letters and figures represent like parts in the drawings.

In the different figures, A represents the body of a rectangular fire-box boiler for the generation of steam. It is constructed with a water-space, $a\ a$, (see Fig. 4,) that surrounds the interior shell, R, on its four sides, and extends from base-ring to crown-sheet of same. A steam-space, B, is obtained above the crown-sheet of the fire-box R by springing an arched cover over the vertical walls of the boiler, as shown in Figs. 1, 2, and 4. To the inside of the crown-sheet of fire-box R the lower end of the cylindrical draft-flue E is attached. This flue penetrates and is secured steam-tight to the arched cover of boiler A, and has its upper end faced off to form a seat for the tripping-valve $c$. (See Fig. 4.) Said valve is operated by the bent lever $e\ e'$.

The valve $c$ is shown closed in Fig. 4 and raised in Fig. 6, to permit draft through the smoke-stack, which is placed upon the top of the bonnet D, which surrounds the valve $c$. A door, Q, is provided in said D to permit access to the valve $c$, when desired. (See Fig. 1, Plate 1.)

Upon the front end of the boiler A a steam-dome, C, is mounted. Upon this dome is placed the safety-valve S and steam-gage U. (See Figs. 1, 2, and 4.) The steam-pipe L is secured to the body of the safety-valve S at 8, as shown in Fig. 4, Plate 3, its other end being attached to the manifold steam-coil $n\ n\ n$, which is suspended in position immediately below the crown-sheet of fire-box R. Steam is controlled in its passage from the dome C to the superheating-coil $n\ n\ n$ by the valve V. (See Fig. 2, Plate 2.)

The fire-box R is provided with two doors, O O, that are placed immediately opposite to each other in the sides of the same. An ash-chamber door, J, is also located on the front side of the boiler A immediately below the grate-bars $o\ o\ o$. (See Fig. 4, Plate 3.) The cylindrical retort F is given the position shown in Fig. 4 below the side doors, O O, and above the grate-bars $o\ o\ o$. It has a flange upon its front end that is bolted fast to the front surface of the boiler A. The body of the retort F is made nearly as long as the interior length of the fire-box R, and its rear end, N, is bent at a right angle and projects down into the ash-chamber G, an orifice, $t$, being cut in the front portion of the lower end, N, for the free escape of gas. (See Figs. 4 and 5.) A cylinder-head is secured to the flange on the front end of the retort F, and to it is rigidly attached the oil-injecting ram H. (See Figs. 1, 2, 3, and 4.) It is constructed as shown in section in Fig. 4, the bent pipe $g$ being connected to the front end of the superheating-coil $n\ n\ n$, and a valve, $r$, being introduced to regulate the flow of superheated steam into the injector H. Upon the under side of said injector H the oil-pipe $v$ is attached, (see Figs. 4 and 5,) a valve, Z, and check-valve $c'$ being introduced to regulate the flow of oil into the injector H. The oil-pipe $r'$ connects with a suitable oil tank or reservoir located preferably in an elevated position. A perforated spraying-pipe, $u$, is attached to the inner end of the injector H. Said pipe $u$ projects into the retort F, as seen in Fig. 4. A gas-outlet is shown at I in Figs. 2 and 4. It is located in the rear side of fire-box R, directly below the superheating-coil $n\ n\ n$. At $g$, Figs. 2 and 4, is seen an inlet for air-blast, which is introduced into the ash-chamber below the fire. Said air-blast is produced by a rotary fan or other suitable device.

$d$ is an ordinary blow-off cock used to empty the boiler A when necessary. A man-hole, P, properly secured, is provided to permit access to the interior of the boiler above the crown-sheet. A glass water-gage and water try-cocks are shown in proper position in Fig. 1, and designated 1 2 3 4. Suitable provision is made for a regular and adequate water-supply to the boiler by means of an injector or pump. (Not shown in the drawings.)

In operation water is first supplied to the boiler A. A fire of coke or hard coal is then started upon the grate $o\ o\ o$ in fire-chamber R. It is made of a sufficient depth to cover the top surface of the retort F. The air-blast is then forced into the ash-chamber G and up through the bed of coals, and, as the valve C has been previously raised, a strong draft and intense combustion is the result, steam being generated and the retort F heated at the same time. When the retort F has attained a proper degree of heat, which is a cherry red, prepare to make gas by first securely closing the doors O O and J, shutting the air-blast valve, and also close the draft-valve C, and secure it by driving the key $s$ behind the bent lever $c'$, as indicated at point $f$, Fig. 4. The fire-chamber being thus securely closed, the gas-outlet I to the purifying apparatus should be opened. Steam is then admitted to the superheating-coil $n\ n\ n$, and the valve $r$ being opened the superheated steam will be forced through the spray-pipe $u$ into the retort F. Immediately after this operation the valve $c'$ is opened a proper distance to admit oil in sufficient quantity to the injector H. The superheated steam drives the oil into the spray-pipe $u$, and, owing to its high temperature, vaporizes the oil and combines with it, so as to form a gaseous compound. This passing through the perforations in the spray-pipe $u$ and striking the sides of the red-hot retort F, the volume of gaseous compound is thoroughly mixed, this being forced, by its rapid development, through the leg N of retort F into the ash-chamber G. A continuation of the operation drives the gas up through the bed of incandescent coals into the fire-chamber R. This operation perfectly fixes the compound gas and produces an illuminating-gas of superior quality. The valve in pipe attached to the gas-outlet I having been opened, as before stated, the gas passes through the same to the proper cooling and purifying apparatus.

The operation of making gas can be advantageously continued while the fire remains in good condition. The crude flake-carbon that pervades the gas at this stage is removed by the fire during the passage of the gas through it, and aids combustion. After the fire is reduced in heat so that the retort is too cool to properly generate gas the manufacture should be suspended to renew the heat. To do this the oil is first shut off, and in a few minutes after the steam-valve $r$ should be closed. The draft-valve $c$ is then raised and the fan-blast started. This forces a current of air into the ash-chamber and expels the gas from the interior of the fire-box. The doors O O upon the sides of the boiler can now be opened, the fire cleaned, and coal put on. Doors O O are now securely closed, fan-blast started, and the operation continued, as hereinbefore described.

I do not desire to restrict myself to the use of the injector H for forcing of oil into the retort F, as it is evident that a force-pump or feeding by gravity from an elevated tank can also be employed. I prefer the device shown, however, as being most efficient in action.

In regard to the carbonaceous liquid to be used, I have designated it as oil. In reality preference is given to crude benzine of about 70° to 74° specific gravity as giving the best results, although crude coal-oil or cheap animal-oils may be used. If it is desired to make a heating-gas the quantity of oil should be diminished or may be entirely dispensed with.

It will be noticed that my process consists, in brief, of the introduction of superheated steam and carbonaceous liquid into the interior of a highly-heated retort, said retort being constructed to deliver the hydrocarbon gas below the fire that generates steam and heats the retort, thus causing the gas to pass up through the incandescent mass of coals and so become homogeneously blended, the surplus flake-carbon burned out forming a fixed hydrocarbon illuminating-gas.

I am aware that there are several different processes and mechanical devices patented and in use for the generation of hydrocarbon gas from steam and carbonaceous liquids. I do not desire, broadly, to claim the manufacture of illuminating or heating gas from superheated steam and carbonaceous liquids, limiting myself to the process herein shown.

My method is essentially a "one-fire process," as the steam is evolved and superheated, oil injected, retort heated, and gas fixed after being generated, by one shallow bed of coals in one compact machine, thus effecting a great saving in the consumption of coal, simplifying the mechanism, saving labor, and reducing the amount and cost of incidental repairs.

Having given a full, clear, and exact description of my process and improved mechanism for carring it into effect, what I claim as new, of my invention, and desire to secure by Letters Patent of the United States, is—

1. The combination of the fire-box, boiler A, retort F N, superheating-coil $n\ n\ n$, pipe $g$, oil-injector H, and spray-pipe $u$, constructed and operating substantially as herein described.

2. The combination of the boiler A, retort F N, doors O O and J, outlet I, draft-flue E, trip-valve $c$, bonnet D, and stack $q$, substantially as herein set forth.

WILLIAM P. PATTON.

Witnesses:
 GEO. K. KING,
 ANTHONY KING.